US009054352B2

United States Patent
Dong et al.

(10) Patent No.: US 9,054,352 B2
(45) Date of Patent: Jun. 9, 2015

(54) SOLID OXIDE FUEL CELL STACK WITH UNIFORM FLOW DISTRIBUTION STRUCTURE AND METAL SEALING MEMBER

(71) Applicant: KOREA INSTITUTE OF ENERGY RESEARCH, Daejeon (KR)

(72) Inventors: Sang Keun Dong, Daejeon (KR); Woo Nam Jeong, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 339 days.

(21) Appl. No.: 13/854,067

(22) Filed: Mar. 30, 2013

(65) Prior Publication Data

US 2014/0093805 A1  Apr. 3, 2014

(30) Foreign Application Priority Data

Sep. 28, 2012  (KR) .................. 10-2012-0109076

(51) Int. Cl.
*H01M 8/04* (2006.01)
*H01M 8/24* (2006.01)
*H01M 8/02* (2006.01)
H01M 8/12 (2006.01)

(52) U.S. Cl.
CPC ...... *H01M 8/04074* (2013.01); *H01M 8/04201* (2013.01); *H01M 8/2485* (2013.01); *H01M 8/2465* (2013.01); *H01M 8/249* (2013.01); *H01M 8/0232* (2013.01); *H01M 8/0245* (2013.01); *H01M 8/0282* (2013.01); *H01M 2008/1293* (2013.01); *H01M 2250/20* (2013.01); *Y02E 60/50* (2013.01); *Y02E 60/525* (2013.01); *Y02T 90/32* (2013.01)

(58) Field of Classification Search
CPC .............. H01M 8/04201; H01M 8/04074; H01M 8/2465; H01M 8/2485; H01M 8/0282; H01M 8/0245; H01M 8/0232; H01M 8/249; H01M 2008/1293; H01M 2250/20; Y02E 60/50; Y02E 60/525; Y02T 90/32
See application file for complete search history.

(56) References Cited

U.S. PATENT DOCUMENTS

2004/0163800 A1 * 8/2004 Richardson ................ 165/109.1
2007/0092781 A1 * 4/2007 Potnis et al. .................... 429/38
2011/0300460 A1 * 12/2011 Barnard et al. ............... 429/427

FOREIGN PATENT DOCUMENTS

| JP | 07-109772 A | 4/1995 |
|----|-------------|--------|
| JP | 07-176315 A | 7/1995 |
| JP | 2006-202727 A | 8/2006 |

(Continued)

OTHER PUBLICATIONS

KIPO Notice of Allowance for Korean Patent Application No. 10-2012-0109076 which corresponds to the above-identified U.S. application.

*Primary Examiner* — Raymond Alejandro
(74) *Attorney, Agent, or Firm* — LRK Patent Law Firm (57) ABSTRACT

A solid oxide fuel cell stack with a uniform flow distribution structure and a metal sealing member is provided, in which fuel and air introduced into the solid oxide fuel cell stack are preheated to a predetermined temperature by heat exchangers provided therein and uniformly distributed over the entire anode and cathode reaction surfaces of unit cells to improve the use efficiency of a fuel cell and in which the sealing of the fuel cell stack is effectively maintained even under high temperature and high pressure conditions to ensure the safety of the fuel cell and increase its durability.

9 Claims, 7 Drawing Sheets

(56) References Cited

FOREIGN PATENT DOCUMENTS

| JP | 2012-003941 A | 1/2012 |
| JP | 5111492 B2 | 10/2012 |
| KR | 10-2007-0117841 A | 12/2007 |
| KR | 10-2012-0078393 A | 7/2012 |

* cited by examiner

SOLID OXIDE FUEL CELL STACK WITH UNIFORM FLOW DISTRIBUTION STRUCTURE AND METAL SEALING MEMBER

CROSS-REFERENCE TO RELATED PATENT APPLICATION

This application claims the benefit of Korean Patent Application No. 10-2012-0109076, filed on Sep. 28, 2012, in the Korean Intellectual Property Office, the disclosure of which is incorporated herein in its entirety by reference.

BACKGROUND OF THE INVENTION

1. Field of the Invention

The present invention relates to a flat solid oxide fuel cell stack and, more particularly, to a solid oxide fuel cell stack with a uniform flow distribution structure and a metal sealing member, in which fuel and air introduced into the solid oxide fuel cell stack are preheated to a predetermined temperature by heat exchangers provided therein and uniformly distributed over the entire anode and cathode reaction surfaces of unit cells to improve the use efficiency of a fuel cell and in which the sealing of the fuel cell stack is effectively maintained even under high temperature and high pressure conditions to ensure the safety of the fuel cell and increase its durability.

2. Description of the Related Art

In general, a fuel cell is a device that generates electricity by electrochemically reacting fuel (hydrogen) and oxygen in the air and is a high efficiency generator that can continuously generate electricity as long as the fuel is supplied. Unlike conventional generators which require a series of generation processes such as "fuel combustion→steam generation→turbine driven→generator driven", the fuel cell does not require any driving mechanism for the combustion of fuel or for the generation and thus has advantages that its efficiency is high and that it does not cause environmental problems such as air pollution, vibration, noise, etc.

Among these fuel cells, a solid oxide fuel cell (SOFC), called a third-generation fuel cell, has a structure in which an anode (fuel electrode) is attached to one side of an electrolyte membrane, a cathode (air electrode) is attached to the other side, and a porous current collector is attached to the anode and the cathode to facilitate the electrochemical reaction. Moreover, the fuel cell includes a separator in which fuel and air channels are formed to supply the fuel and air to the anode and the cathode, respectively, and a sealing member which blocks the flow of fuel and air such that the fuel and air do not flow between the anode and the cathode or between the unit cells and bonds the gap between the respective component layers (see Korean Patent Publication No. 2012-0078393).

In the solid oxide fuel cell having the above-described configuration, when oxygen-containing air is supplied to the cathode and fuel gas such as hydrogen is supplied to the anode, a reverse reaction of water electrolysis occurs through the electrolyte membrane disposed between the cathode and the anode to generate electricity and, during the generation of electricity, water and heat are produced and discharged to the outside. At this time, the voltage of the electricity generated in the unit cell of the fuel cell is not high enough to be useful and thus several cells are typically stacked and connected in series in the form of a stack.

However, in the conventional solid oxide fuel cell having the above-described configuration, the reaction of fuel or air occurs more actively in the unit cells adjacent to an inlet side of the fuel or air channel than in the unit cells adjacent to an outlet side, which thus causes a temperature difference between the inlet side and the outlet side of each unit cell over the entire stack. Moreover, in the case of the conventional fuel cell stack, heat exchangers are provided to preheat the fuel and air to an operating temperature of the cell so as to increase the operating efficiency of the fuel cell. These heat exchangers are provided as a separate structure outside the fuel cell stack. On this account, the entire configuration of the system for operating the fuel cell stack is complicated and requires high installation costs. Moreover, during the operation of the fuel cell stack, the fuel and air preheated by the heat exchangers are not uniformly supplied to the reaction surfaces of the unit cells stacked vertically, which causes a local reaction gas shortage, and thus the reactivity of the stacked unit cells is reduced, thus significantly reducing the efficiency and performance of the fuel cell. Furthermore, according to the conventional fuel cell stack, a sealing member made mainly of a glass material is used to maintain airtightness such that the fuel and air flowing through the channels of the separators, disposed on both sides of the unit cell, are not mixed with each other, and an insulator with airtightness and insulation properties is provided in the other portion of the separator which is not in contact with the unit cell to maintain the sealing of the fuel cell stack. However, when the conventional fuel cell stack using the sealing member made of glass is operated at high temperature and high pressure, a viscous flow of glass occurs, which causes a pressure change in the horizontal direction between the contact surfaces of the unit cell and the stack, thus causing destruction of the unit cells due to the pressure change.

SUMMARY OF THE INVENTION

The present invention has been made in an effort to solve the above-described problems associated with prior art, and an object of the present invention is to provide a solid oxide fuel cell stack in which heat exchangers are provided to preheat fuel and air, introduced into the solid oxide fuel cell stack, to a predetermined temperature and to uniformly distribute the heated fuel and air over the entire anode and cathode reaction surfaces of unit cells stacked vertically, thus preventing performance degradation of a fuel cell due to non-uniform supply of reactant gases to each unit cell.

Moreover, another object of the present invention is to provide a solid oxide fuel cell stack with a metal sealing member in which a sealing member made of a metal material is employed, instead of conventional sealing members made of glass materials, to ensure airtightness of the fuel cell stack, thus improving the sealing effect of fuel cell stack even when the fuel cell stack is operated under high temperature and high pressure conditions and increasing the durability of a fuel cell by ensuring the safety of thermal cycles.

To achieve the above objects of the present invention, there is provided a solid oxide fuel cell stack comprising: a bottom plate including an air inlet and an air outlet formed on one side thereof; an upper plate disposed on an upper side spaced apart from the bottom plate and including a fuel inlet and a fuel outlet formed on one side thereof; a cell stack assembled between the bottom plate and the upper plate and including a plurality of stacked unit cells, each having a structure in which an electrolyte is interposed between an anode and a cathode; a heat exchanger at a cathode side configured to preheat air introduced through the air inlet and uniformly distribute the preheated air to the respective unit cells provided in the cell stack; a heat exchanger at an anode side configured to preheat fuel introduced through the fuel inlet and uniformly distribute the preheated fuel to the respective unit cells provided in the cell stack; and a sealing member for sealing and electrically insulating between the bottom plate, the lower plate, the unit cells, the heat exchanger at the cathode side, and the heat exchanger at the anode side, wherein the cell stack, the heat exchangers, and the sealing member comprises a plurality of flow passages of fuel and air which are formed to penetrate therethrough, respectively, the flow passages including inlet passages through which the fuel and air are introduced and outlet passages through which the fuel and air are discharged, the inlet passages configured in such a manner that their areas gradually decrease from inlet sides thereof to the insides, the outlet passages configured in such a manner that their areas gradually increases toward outlet sides thereof.

Here, at least two cell stacks may be provided in the solid oxide fuel cell stack.

Moreover, the sealing member may comprise a holder, a plurality of insulators, and a plurality of spacers, the holder and the spacers being made of metal materials.

Here, the insulators may be made of mica.

Moreover, in the present invention, a tolerance occurring when the unit cells are stacked may be compensated by controlling the thickness and number of the spacers provided.

Furthermore, the unit cell may comprise a nickel mesh current collector provided at the anode side and a crofer mesh current collector provided at the cathode side.

Here, the current collectors may preferably comprise a nickel-cobalt coating.

In addition, the present invention may provide a fuel cell system comprising the solid oxide fuel cell stack having the above-described configuration, and a fuel cell vehicle comprising the fuel cell system.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the accompanying drawings.

Figure 1:
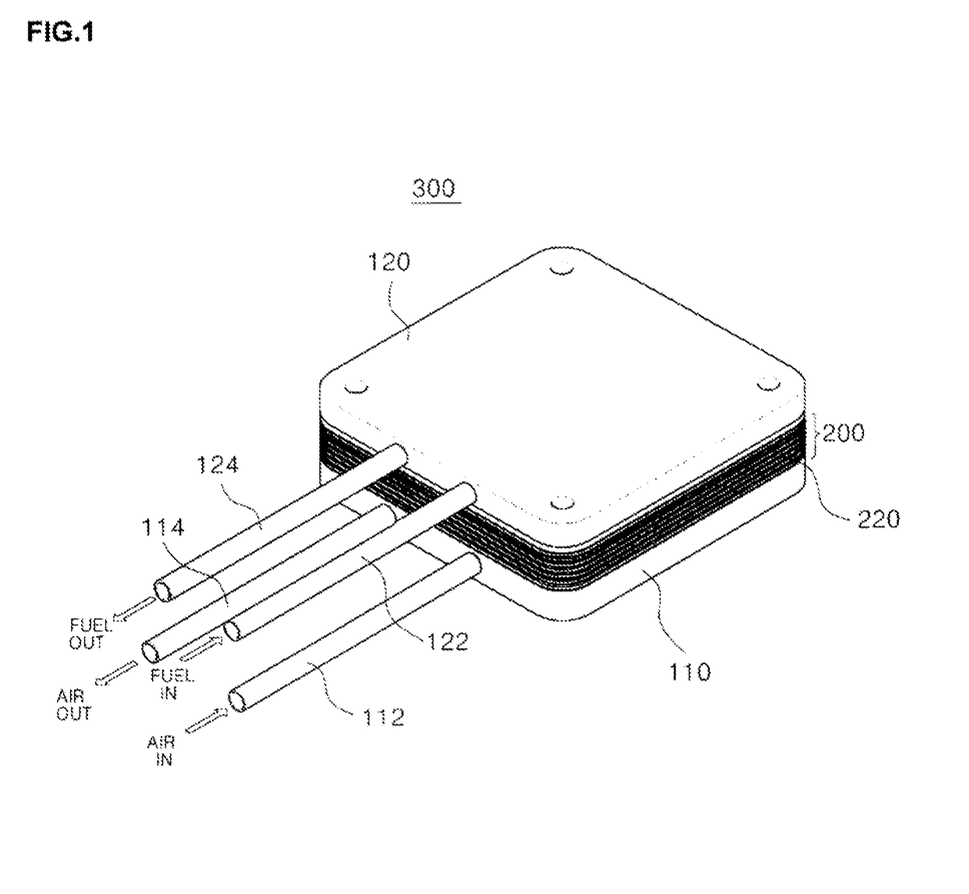
FIG. 1 is a perspective view showing the structure of a solid oxide fuel cell stack in which five unit cells are stacked according to an embodiment of the present invention.
Figure 2:
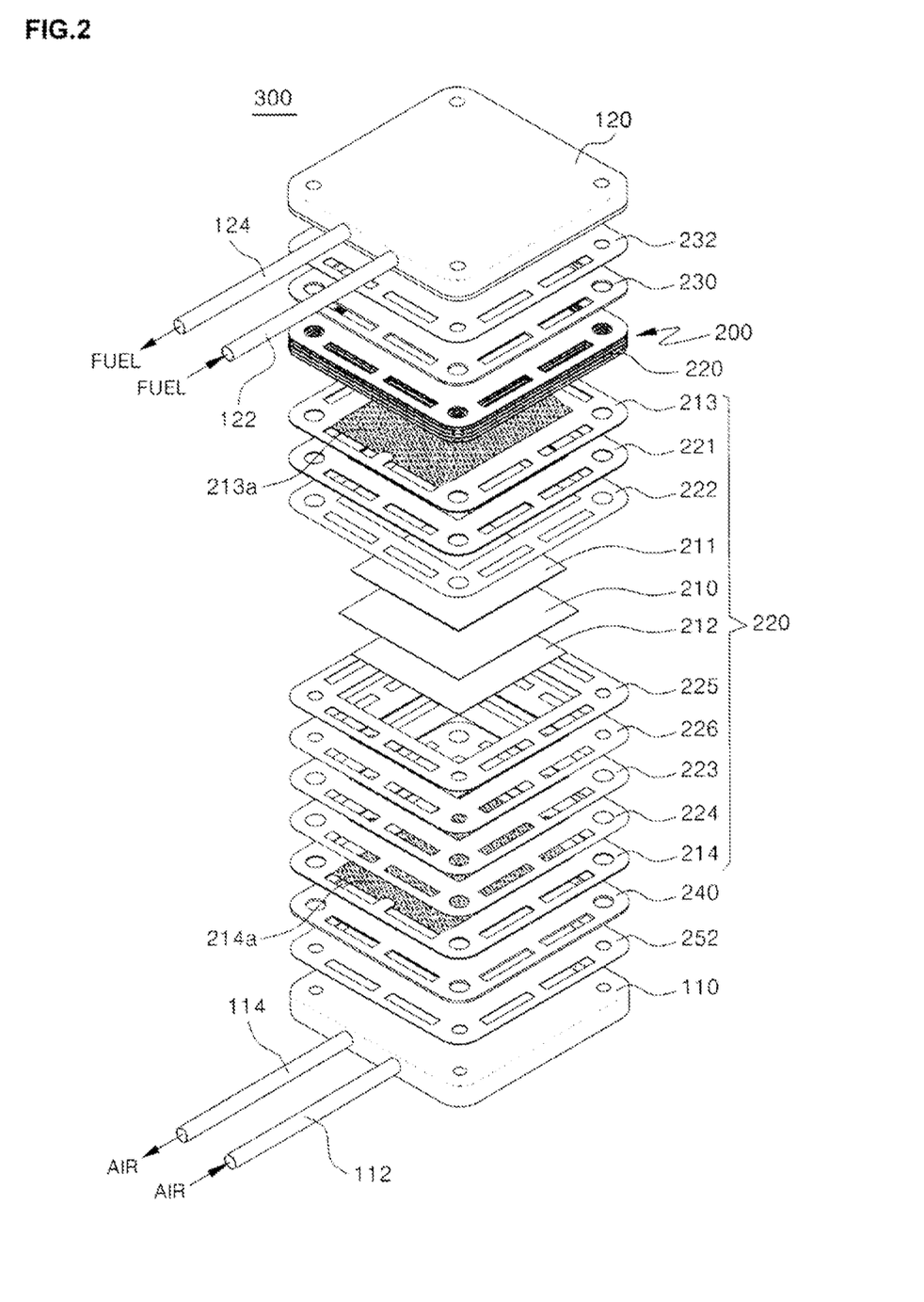
FIG. 2 is an exploded perspective view of FIG. 1.

FIG. 1 is a perspective view showing the structure of a solid oxide fuel cell stack in which five unit cells are stacked according to an embodiment of the present invention, and FIG. 2 is an exploded perspective view of FIG. 1.

Referring to FIGS. 1 and 2, a solid oxide fuel cell stack 300 according to the present invention comprises a bottom plate 110 and an upper plate 120, which form the outer surfaces, a cell stack 200 including a plurality of unit cells 220, heat exchangers 230 and 240, and a sealing member made of a metal material.

An air inlet 112 through which oxygen-containing air is introduced from the outside and an air outlet 114 through which the air reacting with fuel in the cell unit 220 is discharged are provided on one side of the bottom plate 110.

The upper plate 120 is disposed on an upper side spaced a predetermined distance from the bottom plate 110, and a fuel inlet 122 through which fuel (hydrogen) is introduced and a fuel outlet 124 through which the fuel reacting with air in the cell unit 220 is discharged are provided on one side of the upper plate 120.

The cell stack 200 has a structure in which a plurality of (five in this embodiment) unit cells 220 are stacked, and the cell stack 200 is interposed between the bottom plate 110 and the upper plate 120 and assembled with them.

Here, each of the unit cells 220 that constitute the cell stack 200 has a cell 210 in which an electrolyte (not shown) is interposed between an anode 202 and a cathode 204, and current collectors 211 and 212, which are configured to facilitate the reaction between the fuel and air in the surfaces of the electrodes 202 and 204, are provided on the anode 202 and the cathode 204, respectively.

The configuration of the unit cell 220 will now be described in more detail with reference to FIG. 2. In the unit cell 220, separators 213 and 214 are respectively disposed at the top and bottom of a cell 210 located in the middle thereof, and a holder 221, a plurality of insulators 225 and 226, and a plurality of spacers 222, 223, and 224 are interposed between the two separators 213 and 214 to surround the outer surfaces of the cell 210. Moreover, the current collectors 211 and 212 are respectively provided between the cell 210 and the separators 213 and 214 on both sides of the cell 210. Furthermore, a plurality of channels 213a and 214a through which the fuel and air can flow are respectively provided in each of the separators 213 and 214.

A plurality of unit cells 220 each having the above-described configuration are stacked to form a single cell stack 200, and the heat exchangers 230 and 240 are respectively provided at the top (anode side) and the bottom (cathode side) of the cell stack 200, respectively. Here, the heat exchanger 230 provided at the top (anode side) of the cell stack 200 is configured to preheat the fuel introduced through the fuel inlet 122 of the upper plate 120 to a temperature suitable for the reaction of the cells and to uniformly distribute the preheated fuel to the respective unit cells 220 provided in the cell stack 200. Moreover, the heat exchanger 240 provided at the bottom (cathode side) of the cell stack 200 is configured to preheat the air introduced through the air inlet 112 of the bottom plate 110 to a temperature suitable for the reaction of the cells and to uniformly distribute the preheated air to the respective unit cells 220 provided in the cell stack 200.

The sealing member serves to prevent the fuel and air from being mixed between the upper and lower separators 213 and 214 of the cell 210 and, at the same time, to maintain an electrical insulation of the fuel cell stack 300. In the present invention, as the sealing member for maintaining the airtightness of the fuel cell stack 300, a sealing member made of a metal material with high heat resistance and excellent water resistance is employed instead of conventional sealing members made of glass materials.

In detail, the sealing member comprises the holder 221, the plurality of insulators 225 and 226, and the plurality of spacers 222, 223, and 224. Here, mica is used for the insulators 225 and 226. That is, natural mica is cleaved in the form of a thin sheet, and the thin sheets are stacked and bonded with an adhesive, thus forming the insulators 225 and 226 each having a constant thickness. The mica used as the material for the insulators 225 and 226 is not swollen by high-temperature heating and has very low strength degradation after heating. Moreover, due to its high water resistance, it has very high electrical insulation properties even under high humidity conditions. Furthermore, all of the holder 221 and the spacers 222, 223, and 224 are made of metal materials with excellent thermal resistance and strength.

As such, since the components of the sealing member for maintaining the airtightness of the fuel cell stack 300 are all made of non-glass materials, it is possible to maintain the stable sealing function of the fuel cell stack 300 even when the fuel cell stack 300 is operated under high temperature and high pressure conditions.

Figure 3:
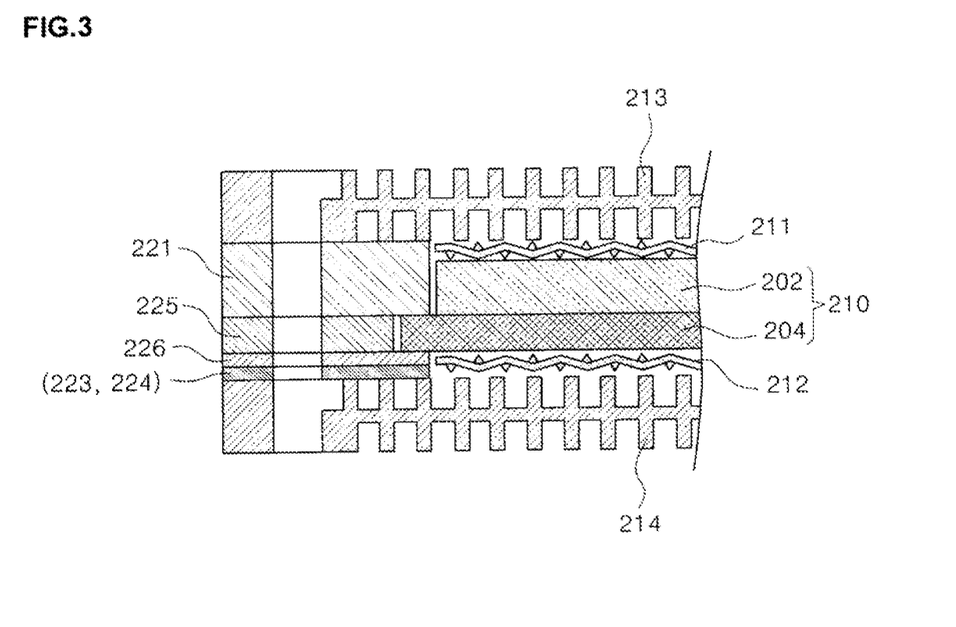
FIG. 3 is a partial cross-sectional view showing a sealing structure of the solid oxide fuel cell stack according to the present invention.

Meanwhile, FIG. 3 is a partial cross-sectional view showing a cross-sectional structure a single unit cell 220 in the solid oxide fuel cell stack 300 according to the present invention. As shown in the figure, the separators 213 and 214 are respectively disposed at the top and bottom of the cell 210 having a structure in which an electrolyte (not shown) is bonded between the anode 202 and the cathode 204, and the current collects 211 and 212 are respectively disposed between the separators 213 and 214 and the anode 202 and the cathode 204. Moreover, as the sealing member configured to prevent the mixing of the fuel and air between the separators 213 and 214 and the cell 210 and, at the same time, to maintain the electrical insulation of the fuel cell stack 300, the holder 221, the insulators 225 and 226, and the spacers 222, 223, and 224 are interposed between the upper and lower separators 213 and 214 and stacked to surround the outer surfaces of the cell 210. Here, it is preferable that the holder 221 and the spacers 222, 223, and 224 be made of metal materials.

Moreover, a nickel mesh is used as the current collector 211 disposed at the top (anode side) of the unit cell 220 and a crofer mesh is used as the current collector 212 disposed at the bottom (cathode side) so as to increase the contact between the reactant gases (fuel and air), which flows between the upper and lower separators 213 and 214, and the electrodes 202 and 204, thus improving the conductivity.

Furthermore, the insulators 225 and 226 and the spacers 222, 223, and 224 may be provided in the form of a plurality of plates having different thicknesses. By controlling the thickness or number of the insulators 225 and 226 and the spacers 222, 223, and 224 provided, it is possible to compensate for a tolerance occurring when the unit cells 220 are stacked. That is, several spacers having specific thicknesses (in this embodiment, thicknesses of 0.05 mm and 0.1 mm are applied) are stacked so as to absorb the tolerance occurring when several unit cells are stacked during assembly of the fuel cell stack 300, and thus it is possible to overcome the problem of tolerance occurring during stacking of the unit cells and to provide a fuel cell stack 300 having a compact structure.

Figure 4:
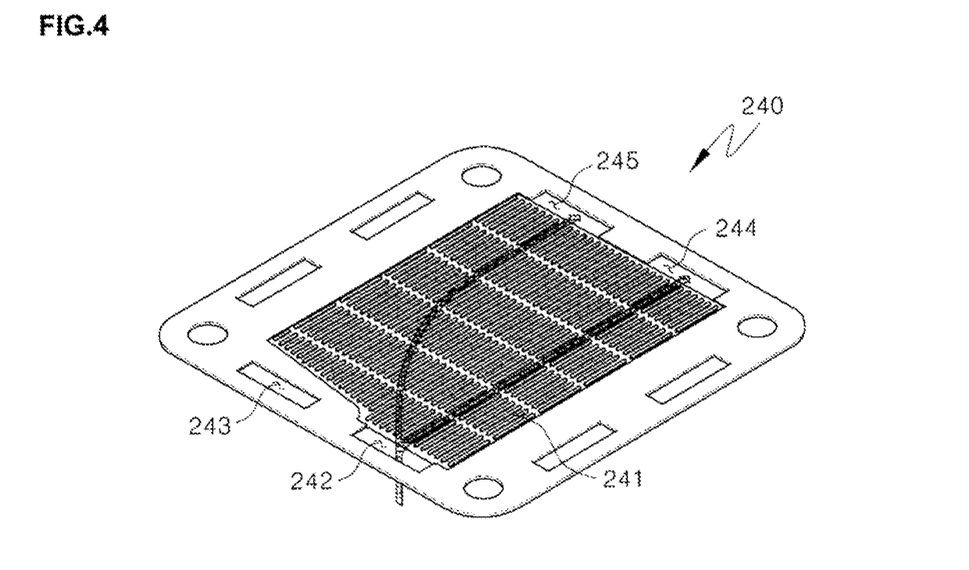
FIG. 4 is a detailed view showing the structure of a heat exchanger provided in the solid oxide fuel cell stack according to the present invention.

Meanwhile, FIG. 4 is a detailed view showing the structure of a heat exchanger provided in the solid oxide fuel cell stack 300 according to the present invention. Here, only the structure of the heat exchanger 240 disposed at the bottom of the cell stack 200 is shown in FIG. 4 for convenience of illustration and, since the heat exchanger 230 disposed at the top of the cell stack 200 has the same structure, a repetitive description thereof will be omitted.

As shown in FIG. 4, the heat exchanger 240 is a plate-type heat exchanger in the form of a rectangular plate, the same as the separators 213 and 214. Like the internal structure of the typical separators 213 and 214, a plurality of linear channels 241 for guiding the flow of reactant gas (in this case, air) is formed at regular intervals in the heat exchanger 240. Moreover, a through hole 242 of a rectangular shape connected to the air inlet 112 of the bottom plate 110 is formed on one end of the channels 241, and through holes 244 and 245 having the same shape as the through hole 242 are formed on the other end of the channels 241, located opposite to the through hole 242. Accordingly, the air introduced through the through hole 242 located on one end of the channels 241 formed in the heat exchanger 240 is distributed along the plurality of channels 241 and then discharged through the through holes 244 and 245 located on the other end of the channels 241. The heat exchanger 240 having the above-described structure is configured to preheat the air to a temperature suitable for the reaction of the cells while passing through the plurality of channels 241 provided therein and to uniformly distribute the flow of air such that the preheated air is uniformly supplied to the reaction surfaces of the electrodes of each cell.

The fuel cell stack 300 of the present invention having the above-described configuration is assembled in the following order.

That is, the fuel cell stack 300 is assembled by stacking in the order of bottom plate 110, insulator 252, heat exchanger 240 at cathode side, separator 214 at cathode side, spacers 223 and 224, current collector 212 (nickel-cobalt coated), insulators 225 and 226, cell 210, spacer 222, holder 221, current collector 211 (nickel-cobalt coated), separator 213 at anode side, . . . repeating the above-mentioned components of the unit cell 220, . . . heat exchanger 230 at anode side, insulator 232, and upper plate 120.

Figure 5:
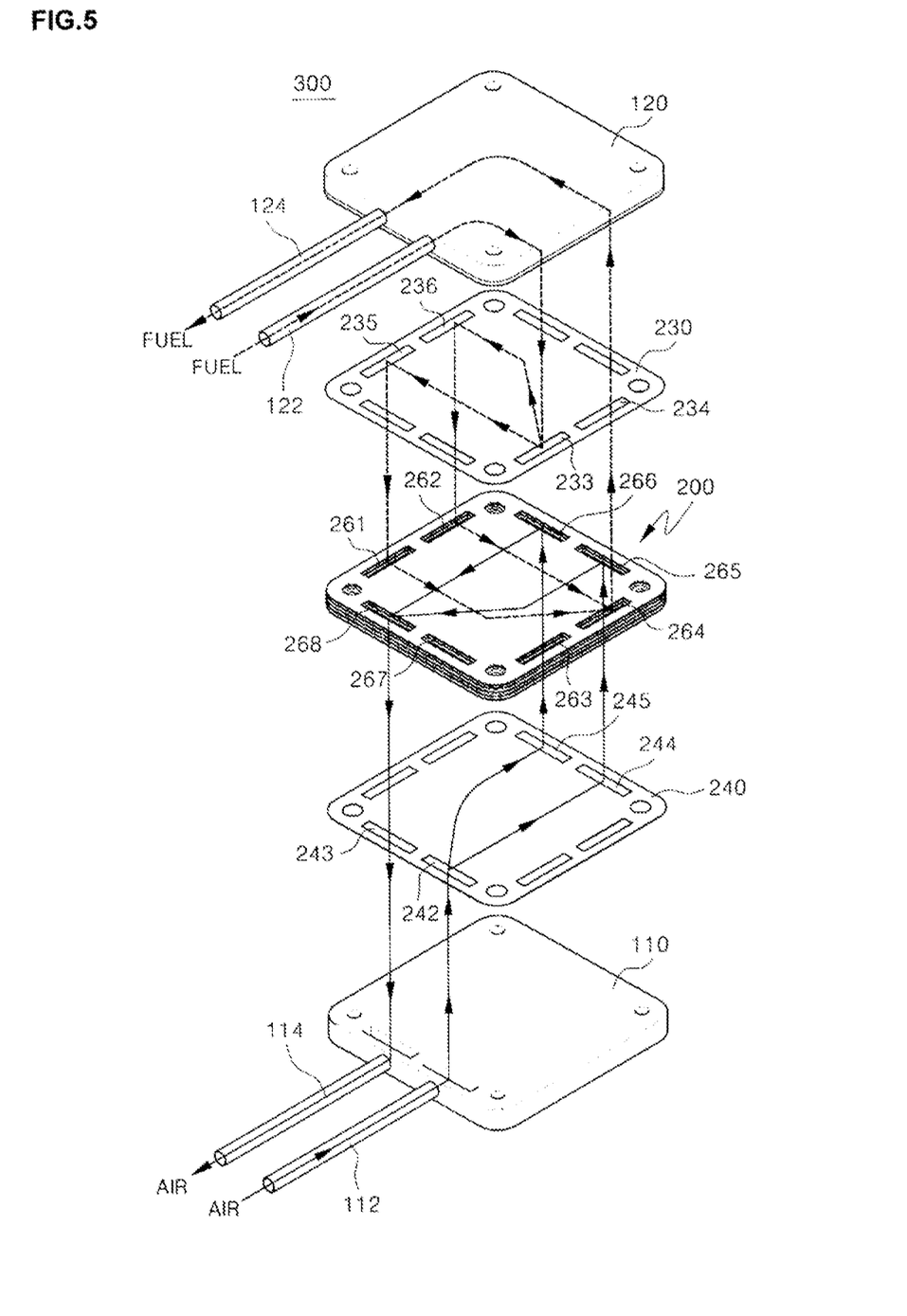
FIG. 5 is a conceptual view showing the flows of fuel and air in the solid oxide fuel cell stack according to the present invention.

Meanwhile, FIG. 5 schematically shows the flows of fuel and air in the solid oxide fuel cell stack 300 having a structure in which five unit cells are stacked according to the present invention.

Here, only the bottom plate 110, the upper plate 120, the heat exchangers 230 and 240, and the components of the cell stack 200, except for the sealing member, are shown in FIG. 5. The detailed structure of the heat exchangers 230 and 240 is the same as that in FIG. 4.

First, the flow of fuel gas at the anode side will be described with reference to the figure. The fuel (hydrogen) introduced through the fuel inlet 122 formed in the upper plate 120 is fed through a through hole 233 formed on one side (right) of the heat exchanger 230 located therebelow and then passes through a plurality of channels (not shown) formed in the heat exchanger 230. In this process, the fuel is distributed over the entire inside area of the heat exchanger 230, preheated to a predetermined temperature, passes through two through holes 235 and 236 located on the other side (left), and then supplied to the unit cells 220 located therebelow. Then, the fuel supplied to the unit cells 220 electrochemically reacts with air at the cathode side in each unit cell 220, exits the unit cells 220 through a through hole 264 located on the opposite side (right) of each unit cell 220, passes through a through hole 234 on the right side of the upper heat exchanger 230, and is then discharged to the outside through the fuel outlet 124 of the upper plate 120.

Meanwhile, referring to the flow of air at the cathode side, the air introduced through the air inlet 112 formed in the bottom plate 110 is fed through a through hole 242 formed on one side (front) of the heat exchanger 240 located thereon and then passes through a plurality of channels (not shown) formed in the heat exchanger 240. In this process, the air is distributed over the entire inside area of the heat exchanger 240, preheated to a predetermined temperature, passes through two through holes 244 and 245 located on the other side (rear), and then supplied to the unit cells 220 located thereon. Then, the fuel supplied to the unit cells 220 electrochemically reacts with fuel at the anode side in each unit cell 220, exits the unit cells 220 through a through hole 268 located on the opposite side (front) of each unit cell 220, passes through a through hole 243 on the front side of the lower heat exchanger 230, and is then discharged to the outside through the air outlet 114 of the bottom plate 110.

As such, in the fuel cell stack 300, the heat exchangers 230 and 240 having the plurality of channels are respectively provided at the top and bottom of the cell stack 200 having a structure, in which a plurality of unit cells 220 are stacked, such that the fuel and air introduced into the fuel cell stack 300 can be uniformly distributed through the channels formed in each of the heat exchangers 230 and 240 and, at the same time, preheated to a temperature suitable for the reaction of the cells and uniformly supplied to the reaction surfaces of the electrodes of each cell, and thus it is possible to increase the reactivity of the cells and significantly improve the performance and efficiency of the fuel cell.

Moreover, the sealing member provided to maintain the airtightness of the fuel cell stack 300 is made of a metal material, instead of conventional glass materials, and thus it is possible to provide a fuel cell stack having excellent thermal resistance under high temperature and high pressure conditions, excellent water resistance under high humidity conditions, and high electrical insulation properties and capable of facilitating the maintenance.

Figure 6:
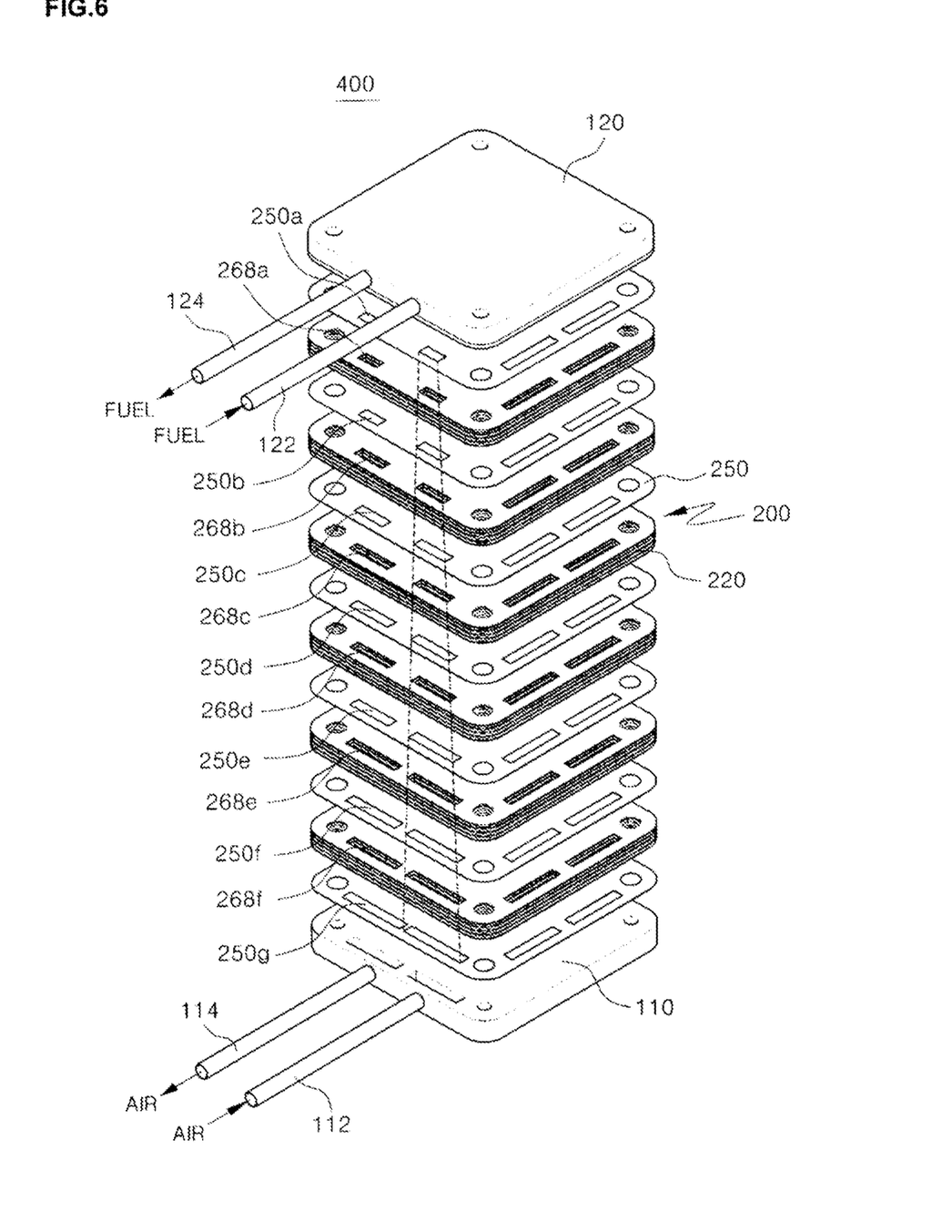
FIG. 6 is a conceptual view showing the structure of a solid oxide fuel cell stack in which thirty unit cells are stacked according to another embodiment of the present invention.
Figure 7A:
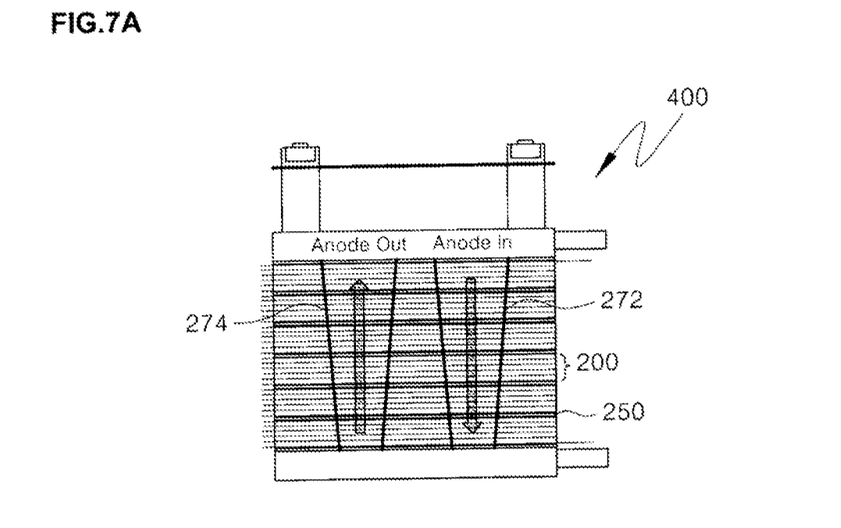
FIGS. 7A and 7B are a conceptual view showing an assembled state of the solid oxide fuel cell stack of FIG. 6, in which flow passage structures of liquids at anode and cathode sides of the solid oxide fuel cell stack are shown.
Figure 7B:
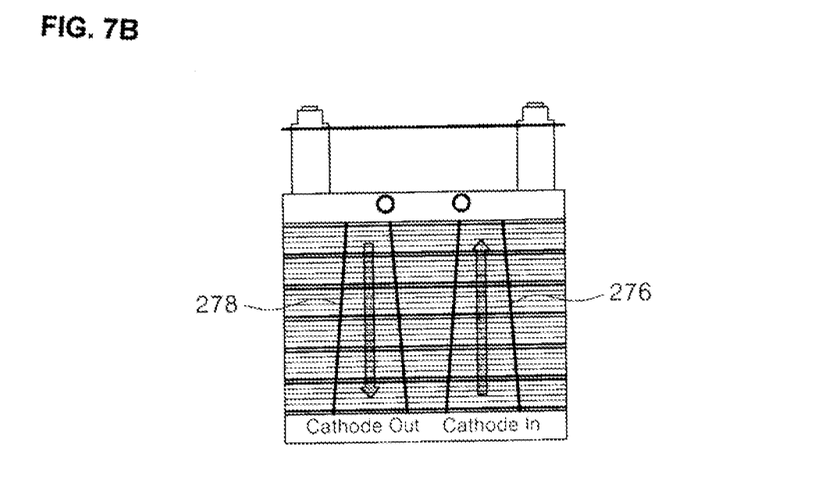

Meanwhile, FIG. 6 shows the structure of a solid oxide fuel cell stack in which a total of thirty unit cells are stacked according to another embodiment of the present invention, adapted from the structure of the solid oxide fuel cell stack in which five unit cells are stacked as described in FIG. 2. FIGS. 7A and 7B show an assembled state of the solid oxide fuel cell stack of FIG. 6, in which vertical flows of fuel and air at the anode and cathode sides of the solid oxide fuel cell stack are shown.

Referring to FIG. 6, a solid oxide fuel cell stack 400 according to a second embodiment of the present invention has a structure in which a plurality of (e.g., a total of six) cell stacks 200 each including five unit cells 220, which have been described in the first embodiment, are stacked with a heat exchanger 250 interposed therebetween. Here, in the solid oxide fuel cell stack 400, the flow passage of fuel at the anode side and the flow passage of air at the cathode side are the same as the flow passages of fuel and air, which have been described in FIG. 5, and thus a repetitive description will be omitted.

In the fuel cell stack 400, through holes 250a to 250g and 268a to 268f, which are formed on edges of the cell stack 200, the heat exchanger 250, and a sealing member (not shown), respectively, have different sizes (areas) in the vertical direction such that the fuel and air can flow in the vertical direction of the fuel cell stack 400. That is, the flow passages of fuel and air in the vertical direction, which are formed when the through holes 250a to 250g and 268a to 268f formed on the edges of the respective components (such as the cell stack, heat exchanger, and sealing member) in the stacked structure are connected to each other, gradually increased or decreased.

Here, among the flow passages of fuel and air in the vertical direction, it is preferable that inlet passages 272 and 276, through which the fuel and air are introduced, be formed in such a manner their areas gradually decrease from inlet sides (upper sides) to the insides (lower sides) as shown in FIG. 7A, and outlet passages 274 and 278, through which the fuel and air are discharged, be formed in such a manner their areas gradually increases toward outlet sides as shown in FIG. 7B.

As such, when the inlet passage 272 through which the fuel is introduced is formed in such a manner that its size gradually decreases from the inlet (top) to the inside (bottom) as shown in FIG. 7A, the flow velocity of fuel moving along the inside of the inlet passage 272 gradually increases from the top, through which the fuel is initially introduced, toward the bottom, and thus the fuel gas can be smoothly supplied up to the unit cell located at the bottom of the fuel cell stack 400. Accordingly, it is possible to evenly and uniformly distribute and supply the fuel to the respective unit cells 220 stacked in the vertical direction, which reduces the reaction loss due to uneven distribution of fuel to the unit cells, leading to an improvement in the performance of the fuel cell. Moreover, when the outlet passage 274 through which the fuel is discharged is formed in such a manner that its size gradually increases from the inside (bottom) to the outlet (top), the fuel is discharged at a high flow velocity from the bottom (inside) of the fuel cell stack 400, which is the farthest away from the fuel outlet 124, and thus the fuel can be smoothly discharged through the fuel outlet 124 at the top. Likewise, as shown in FIG. 7B, since the inlet passage 276, through which the air is introduced is formed in such a manner that its size gradually decreases from the inlet (bottom), through which the air is initially introduced, toward the inside (top), the flow velocity of air moving from the bottom to the top of the inlet passage 276 gradually increases, and thus the air can be smoothly supplied up to the unit cell located at the top of the fuel cell stack 400. Accordingly, it is possible to evenly and uniformly distribute and supply the air to the respective unit cells 220, leading to an improvement in the operating performance of the fuel cell.

Figure 8:
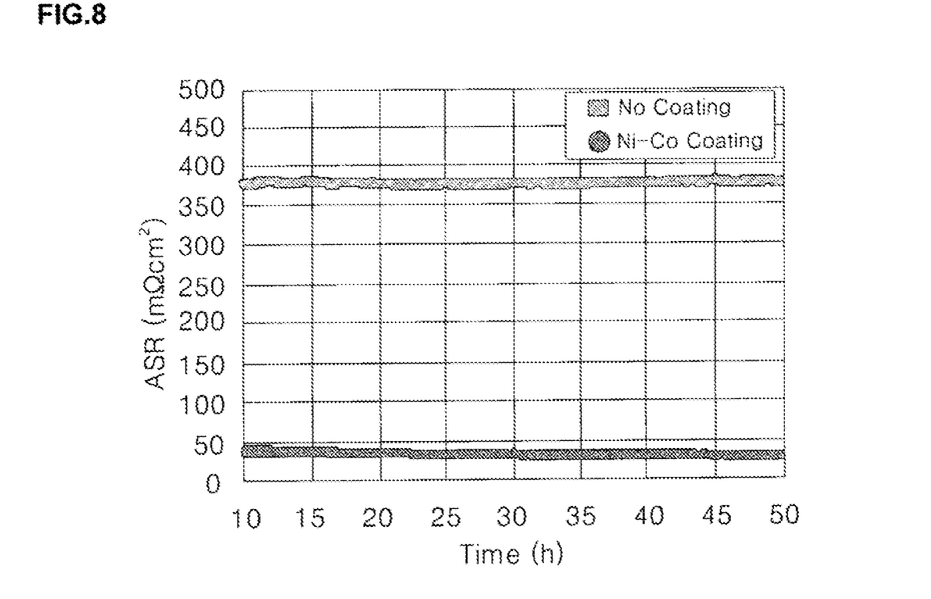
FIGS. 8 and 9 are graphs showing the area-specific resistance with respect to the presence of a nickel-cobalt (Ni—Co) coating in separators and current collectors of the solid oxide fuel cell stack according to the present invention.
Figure 9:
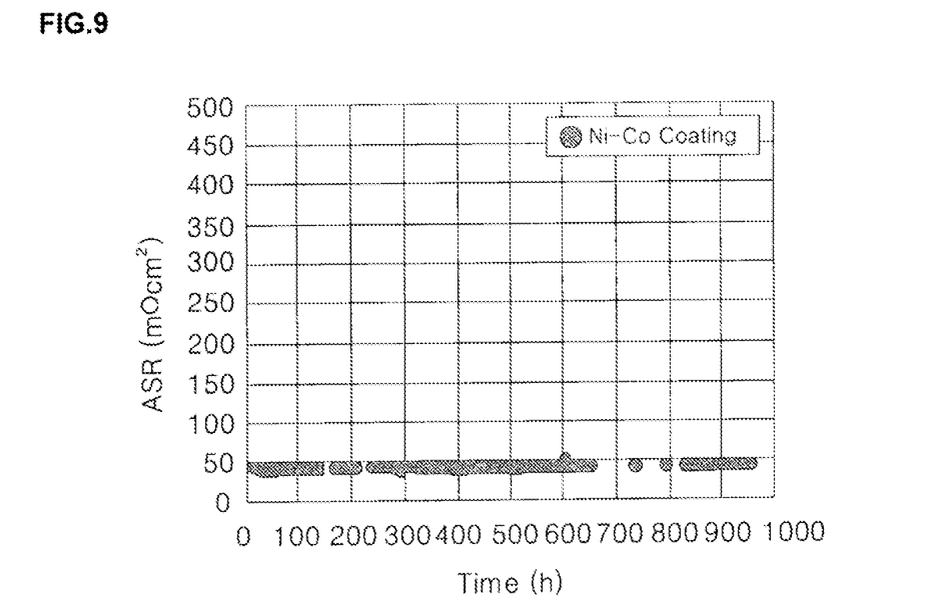

Meanwhile, FIGS. 8 and 9 are graphs showing the area-specific resistance with respect to the presence of a nickel-cobalt (Ni—Co) coating in the separators 213 and 214 and the current collectors 211 and 212 comprising a nickel mesh and a crofer mesh, which are provided in the cell unit 220 of the solid oxide fuel cell stack according to the present invention.

Here, FIG. 8 shows the area-specific resistance (ASR) values over time with respect to the presence of a nickel-cobalt coating in test samples (current collectors), in which the upper line shows the ASR values of the sample with no coating and the lower line shows the ASR values of the sample with the Ni—Co coating. As can be seen from the graph of FIG. 8, the ASR values are significantly lower in the sample with the Ni—Co coating.

Moreover, FIG. 9 shows the area-specific resistance (ASR) values of the test sample with the Ni—Co coating, measured for a long time. As can be seen from the graph of FIG. 9, the test sample stably maintains the low area-specific resistance over a long time of 1,000 hours. As such, when the nickel-cobalt coating is provided on the separators and the current collectors of the fuel cell stack, it is possible to increase the durability of the fuel cell stack.

As described above, according to the solid oxide fuel cell stack of the present invention, in which heat exchangers are provided to preheat fuel and air, introduced into the solid oxide fuel cell stack, to a predetermined temperature and to uniformly distribute the heated fuel and air over the entire anode and cathode reaction surfaces of unit cells stacked vertically, it is possible to increase the reactivity of the cells and significantly improve the performance and efficiency of the fuel cell. Moreover, among the flow passages of fuel and air, formed to vertically penetrate the cell stack, the heat exchangers, and the sealing member in the fuel cell stack, the inlet passages, through which the fuel and air are introduced, are configured in such a manner that their areas gradually decrease from inlet sides thereof to the insides, and the outlet passages, through which the fuel and air are discharged, are configured in such a manner that their areas gradually increases toward outlet sides thereof. As a result, it is possible to evenly distribute the fuel and air to the respective unit cells due to the vertical flow passage structures, thus preventing the reaction loss in the fuel cell due to non-uniform supply of reactant gases to each unit cell.

Furthermore, as the sealing means for ensuring the airtightness of the fuel cell stack according to the present invention, a sealing member made of a metal material with high heat resistance and excellent water resistance is employed instead of conventional sealing members made of glass materials, and thus it possible to increase the sealing effect of the fuel cell stack without any damage to the unit cells even when the fuel cell stack is operated under high temperature and high pressure conditions, maintain high electrical insulation properties under high humidity conditions, and increase the durability of the fuel cell by ensuring the safety of thermal cycles.

In addition, several spacers made of metal materials and having specific thicknesses are stacked so as to absorb the tolerance occurring when several unit cells are stacked during assembly of the fuel cell stack, and thus it is possible to overcome the problem of tolerance occurring during stacking of the unit cells and to provide a fuel cell stack having a compact structure.

Additionally, the nickel-cobalt coating is provided on the separators and the current collectors of the fuel cell stack, and thus it is possible to further improve the performance of the fuel cell stack and increase the durability of the fuel cell stack by reducing the heat generation.

Also, when a fuel supply means and an air supply means for supplying fuel and air to one or more unit cells provided in the fuel cell stack are provided in the solid oxide fuel cell stack having the above-described configuration, it is possible to provide a fuel cell system having higher efficiency and capable of stably operating. Moreover, with the use of this fuel cell system, it is possible to provide a high efficiency fuel cell vehicle having high electricity generation efficiency.

While the invention has been shown and described with reference to certain preferred embodiments thereof, it will be understood by these skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A solid oxide fuel cell stack comprising:
   a bottom plate including an air inlet and an air outlet formed on one side thereof;
   an upper plate disposed on an upper side spaced apart from the bottom plate and including a fuel inlet and a fuel outlet formed on one side thereof;
   a cell stack assembled between the bottom plate and the upper plate and including a plurality of stacked unit cells, each having a structure in which an electrolyte is interposed between an anode and a cathode;
   a heat exchanger at a cathode side configured to preheat air introduced through the air inlet and uniformly distribute the preheated air to the respective unit cells provided in the cell stack;
   a heat exchanger at an anode side configured to preheat fuel introduced through the fuel inlet and uniformly distribute the preheated fuel to the respective unit cells provided in the cell stack; and
   a sealing member for sealing and electrically insulating between the bottom plate, the lower plate, the unit cells, the heat exchanger at the cathode side, and the heat exchanger at the anode side,
   wherein the cell stack, the heat exchangers, and the sealing member comprise a plurality of flow passages of fuel and air which are formed to penetrate therethrough, respectively, the flow passages including inlet passages through which the fuel and air are introduced and outlet passages through which the fuel and air are discharged, the inlet passages configured in such a manner that their areas gradually decrease from inlet sides thereof to the insides, the outlet passages configured in such a manner that their areas gradually increases toward outlet sides thereof.

2. The solid oxide fuel cell stack of claim 1, wherein at least two cell stacks are provided.

3. The solid oxide fuel cell stack of claim 1, wherein the sealing member comprises a holder, a plurality of insulators, and a plurality of spacers, the holder and the spacers being metal materials.

4. The solid oxide fuel cell stack of claim 3, wherein the insulators are made of mica.

5. The solid oxide fuel cell stack of claim 3, wherein a tolerance occurring when the unit cells are stacked is compensated by controlling the thickness and number of the spacers provided.

6. The solid oxide fuel cell stack of claim 1, wherein the unit cell comprises a nickel mesh current collector provided at the anode side and a crofer mesh current collector provided at the cathode side.

7. The solid oxide fuel cell stack of claim 6, wherein the current collectors comprise a nickel-cobalt coating.

8. A fuel cell system comprising:
   a solid oxide fuel cell stack including at least one unit cell for generating electrical energy by an electrochemical reaction between fuel and air;
   a fuel supply means for supplying fuel to the unit cells provided in the fuel cell stack; and
   an air supply means for supplying air to the unit cells provided in the fuel cell stack,
   wherein the solid oxide fuel cell stack comprises:
   a bottom plate including an air inlet and an air outlet formed on one side thereof;
   an upper plate disposed on an upper side spaced apart from the bottom plate and including a fuel inlet and a fuel outlet formed on one side thereof;
   a cell stack assembled between the bottom plate and the upper plate and including a plurality of unit cells stacked, each having a structure in which an electrolyte is interposed between an anode and a cathode;
   a heat exchanger at a cathode side configured to preheat air introduced through the air inlet and uniformly distribute the preheated air to the respective unit cells provided in the cell stack;
   a heat exchanger at an anode side configured to preheat fuel introduced through the fuel inlet and uniformly distribute the preheated fuel to the respective unit cells provided in the cell stack; and a sealing member for sealing and electrically insulating between the bottom plate, the lower plate, the unit cells, the heat exchanger at the cathode side, and the heat exchanger at the anode side, wherein the cell stack, the heat exchangers, and the sealing member comprise a plurality of flow passages of fuel and air which are formed to penetrate therethrough, respectively, the flow passages including inlet passages through which the fuel and air are introduced and outlet passages through which the fuel and air are discharged, the inlet passages configured in such a manner that their areas gradually decrease from inlet sides thereof to the insides, the outlet passages configured in such a manner that their areas gradually increases toward outlet sides thereof.

9. A fuel cell vehicle comprising the fuel cell system of claim 8.

* * * * *